Patented Sept. 2, 1924.

1,507,210

UNITED STATES PATENT OFFICE.

PAUL C. SEEL, OF ROCHESTER, NEW YORK, ASSIGNOR TO EASTMAN KODAK COMPANY, OF ROCHESTER, NEW YORK, A CORPORATION OF NEW YORK.

PROCESS OF MAKING CELLULOSE ETHERS.

No Drawing.      Application filed April 5, 1921. Serial No. 458,748.

*To all whom it may concern:*

Be it known that I, PAUL C. SEEL, a citizen of the United States of America, residing at Rochester, in the county of Monroe and State of New York, have invented certain new and useful Improvements in Processes of Making Cellulose Ethers, of which the following is a full, clear, and exact specification.

This invention relates to the manufacture of cellulose ethers. One object of the invention is to provide a process which will produce cellulose ethers which will yield strong, flexible, transparent sheets or films. Another object of my invention is to provide an improved way of preliminarily preparing certain of the ingredients, so that they function better during the etherification process. Other objects will hereinafter appear.

It has been proposed to manfacture cellulose ethers by reacting on an intimate mixture of cellulose and alkali with an etherifying agent, small amounts of water being present in some cases. The etherification may be performed in an autoclave which is suitably heated during the time of the reaction and the contents agitated.

It has been found that the possibility of obtaining strong, flexible and transparent films from such ethers depends to an unexpected degree upon the manner and thoroughness with which the alkali (and the water if the latter is used) is mixed with the cellulose prior to etherification. If the mixture is not thorough, whitish fibers, particles, or haze appear in the finished films. This is the undesirable result which occurs, for example, when the cellulose fibers, the alkli and the water are charged into an ordinary chemical mixer with slowly moving blades or paddles.

I have discovered that the cellulose and alkali, or cellulose, alkali and water, may be entirely mixed to the necessary degree for the production of transparent films by subjecting these ingredients in an unmixed or crudely mixed condition to rapidly repeated impacts, sufficiently violent to thoroughly disintegrate the fibers and other ingredients and mix even the smallest particles of them thoroughly. This may be done by charging them into a disintegrating mill in which a series of rapidly revolving arms repeatedly strike and throw the material in different directions, the action of the blades being to give a series of violent blows as distinguished from a mere pushing or rubbing action. I find that bundles of woody cellulose fibers, when treated in this way, are thoroughly broken apart or fractured into individual filaments, and cotton fibers are torn apart, so that there is no clumping, but the fibers are thoroughly torn or shredded apart. Of course, the alkali and the water, if present, is comminuted and brought in contact with practically every fiber of the cellulose.

While I may charge a batch of material into a disintegrating mill and subject it to violent impacts until the entire mass is thoroughly mixed, I prefer to remove such particles of the mass as have been properly treated before the whole mass has reached the proper state. This is preferably done by a current of air, the velocity of which is properly gauged to carry away material of the correct degree of fluffiness. In this way, the operation may be made continuous, raw material being charged in at one end and the finished mixture being removed in a stream at the other end. The fluffy mixture, known as alkali cellulose or soda cellulose, is collected from the air current and then treated with an etherifying agent in an autoclave.

I will now give one example of my invention, but it will be obvious that the steps may be widely varied so long as the principle of disintegrating with violent impacts is utilized. I may charge 100 parts of cotton or wood cellulose or cellulose tissue into a disintegrating mill along with 250 parts of water and 200 parts of caustic soda. The mill may be of any commercial kind, the blades of which are driven at a very high speed. A current of air is moved through the mill and carries away the entirely mixed and shredded fibers, caustic soda, and water. This material is then collected from such air current and is found to be in a state which allows the etherifying reaction to proceed on practically every fiber of the mass. It is charged into an autoclave with 400 parts of ethyl chloride for each 100 parts of cellulose in the mixture. The autoclave is then heated for say twenty-four hours at temperatures between 90 and 170° C.

While in the broader aspects of my invention, the control of the air during the disintegrating process is not indispensable, I prefer to keep the air dry during the disintegrating action in any suitable way. For example, the mill may be installed in an enclosure, the walls of which are heat insulated, there being brine coils in the enclosure upon which the moisture is condensed. The air contacting with the material during the mixing and disintegrating step may, therefore, contain a diminished amount of moisture which moreover is definitely regulated in this manner.

Having thus described my invention, what I claim as new and desire to secure by Letters Patent is:

1. The process of treating a mixture containing cellulose and alkali for the subsequent etherification of the cellulose, which comprises the step of thoroughly disintegrating said mass by subjecting it to repeated violent impacts.

2. In the manufacture of cellulose ethers, the step of subjecting a mass containing cellulose and alkali to repeated violent disintegrating impacts until the cellulose fibers are thoroughly forced apart and intimately mixed with the alkali.

3. In the manufacture of cellulose ethers, the steps of subjecting a mass containing cellulose and alkali to repeated violent disintegrating impacts, and acting on the particles thus formed with a force which transports the lighter particles more readily than the heavier particles, and finally collecting said lighter particles.

4. The process of making cellulose ethers, which comprises the step of subjecting a mass containing cellulose and an alkali metal hydroxid to repeated violent disintegrating impacts until the cellulose fibers are thoroughly forced apart and intimately mixed with said hydroxid.

5. The process of making cellulose ethers, which comprises the steps of subjecting a mass containing cellulose and an alkali metal hydroxid to repeated violent impacts and while thus subjected, removing from the mass the lighter particles by a stream of gas, and then collecting said particles.

6. The process of making cellulose ethers, which comprises the step of subjecting a mass containing cellulose and an alkali metal hydroxid and water to repeated violent disintegrating impacts until the cellulose fibers are thoroughly forced apart and intimately mixed with the other ingredients.

7. The process of making cellulose ethers, which comprises the steps of subjecting a mass containing cellulose, an alkali metal hydroxid and water to repeated violent disintegrating impacts, and acting on the particles thus formed with a force which transports the lighter particles more readily than the heavier particles, and then collecting said lighter particles.

8. The process of making cellulose ethers, which includes the steps of subjecting a mass containing cellulose and alkali to repeated violent disintegrating impacts and then etherifying the cellulose in said mass.

9. The process of making alkyl ethers of cellulose, which comprises the steps of subjecting a mass containing cellulose and alkali to repeated violent disintegrating impacts until the cellulose fibers are thoroughly forced apart and intimately mixed with the alkali, and then alkylating the cellulose.

10. The process of making cellulose ethers, which comprises the steps of subjecting a mass containing cellulose and an alkali metal hydroxid to repeated violent disintegrating impacts until the cellulose fibers are thoroughly forced apart and intimately mixed with the hydroxid, and then alkylating said cellulose.

11. The process of making cellulose ethers, which comprises the steps of subjecting a mass containing cellulose and an alkali metal hydroxid and water to repeated violent disintegrating impacts until the cellulose fibers are thoroughly forced apart and intimately mixed with the hydroxid and water, and then ethylating said cellulose.

12. The process of making cellulose ethers, which comprises the steps of subjecting a mass containing cellulose fibers, water, and an alkali metal hydroxid to repeated violent disintegrating impacts, and removing moisture from the atmosphere in which said impacts take place.

Signed at Rochester, New York, this 26th day of March, 1921.

PAUL C. SEEL.